(12) United States Patent
Lane

(10) Patent No.: US 6,757,379 B1
(45) Date of Patent: Jun. 29, 2004

(54) APPARATUS FOR THE ATTACHMENT OF A COMPUTER TO A TELEPHONE SET, AND A COMPUTER COMPRISING THE SAME

(75) Inventor: Malysa Lane, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/372,716

(22) Filed: Aug. 11, 1999

(30) Foreign Application Priority Data

Jun. 2, 1999 (EP) .............................................. 99401378

(51) Int. Cl.[7] .............................. H04M 1/00; H04M 9/00
(52) U.S. Cl. ............................. 379/387.01; 379/73.05; 379/442
(58) Field of Search ............................ 379/387.01, 393, 379/419, 441, 442, 446, 83.13, 93.05, 101.01, 428.02

(56) References Cited

U.S. PATENT DOCUMENTS

| | | | |
|---|---|---|---|
| 5,764,627 A | | 6/1998 | Sharma et al. |
| 6,021,184 A | * | 2/2000 | Yoshikawa |
| 6,138,036 A | * | 10/2000 | O'Cinneide |

FOREIGN PATENT DOCUMENTS

| | | |
|---|---|---|
| WO | 95/26604 | 10/1995 |
| WO | 98/07233 | 2/1998 |

* cited by examiner

*Primary Examiner*—Duc Nguyen

(57) ABSTRACT

An apparatus for attaching a personal computer (40) comprising an audio system to a telephone network. The apparatus comprises first connector (12, 16) for the connection to the base (20) of a telephone set of a telephone system, second connector (14, 22) for the attachment of a handset (30). When the apparatus and the personal computer are powered-off, the connection between the first connector (12, 16) and the second connector means (14, 22) is maintained so that the handset (30) can be directly used in association with its base. In power-on condition of the personal computer, the voice signal generated by the microphone of the handset (30) or an analog signal of the audio system of the PC (40) is being diverted and transmitted to the base (20) of said telephone system. This useful arrangement allows the PC personal computer can get rid of any line interface requirements since it takes advantage of the line interface of the base (20), what is very useful when the attachment is to be made to a PABX telephone system. The audio system of the PC is also equipped with a headset (50) which therefore permits to use the latter as a hand-free phone external kit.

7 Claims, 2 Drawing Sheets

APPARATUS FOR THE ATTACHMENT OF A COMPUTER TO A TELEPHONE SET, AND A COMPUTER COMPRISING THE SAME

TECHNICAL FIELD OF THE INVENTION

The invention relates to telecommunications and more particularly to an apparatus for permitting the attachment of a computer to an existing telephone system.

BACKGROUND ART

The incorporation of telecommunications capabilities into a Personal Computer (PC)—and particularly telephone functions—is now widely generalized. This is generally achieved by means of a a modem which permits the attachment of the computer to a Public Switched Telecommunication Network (P.S.T.N.), thereby allowing data communications, for instance with an Internet Service Provider (ISP) which provides an access to the Internet network. The more recent modems allow sophisticated telephone facilities, such as voice announcement, voice recording, automated attendant and fax server and auto-dialing process.

However, the association of a personal computer with a modem for the access to a PSTN is not always possible.

First of all, it may well occur that the PC is not connected to any existing modem. In large organizations and entreprises, the computers are connected to a private network, such as a Local Area Network (L.A.N.) for instance, which provides communication facilities and connection to the outside world. For instance, the L.A.N. permits a direct access to the internet network, and permits the exchange of email messages. Any additional modem equipment would be largely superfluous in this environment.

Moreover, the connection of a modem equipment to a personal computer might even be impossible. This is a second situation where any modem attachment is impossible because the telephone network which is available is based on a proprietary integrated Private Automatic Branch Exchange (P.A.B.X.) offering service control and data functions. The PABX system may be generally provided with voice announcement, voice recording, automated attendant and fax server, DTMF digits collection capabilities, all of which provide powerful functions under control of the telephone set connected to the PABX system. Although these features are powerful, they are not easy to use because of the very poor user interface and interaction permitted by the classical telephone keyboard.

Thus in many situations, a personal computer cannot be connected to a PSTN via modem equipment and, therefore, cannot take advantage of the powerful facilities that the modem provides. In a large organization, a particular user is often equipped with both a telephone set and a personal computer, and the two pieces of equipment are unlikely to develop any kind of interaction with each other. It should be particularly noticed that the difficulty particularly results from the proprietary characteristics of the PABX—in terms of line impedance and voltage or phone signaling—that are used in the private PABX, and which differ from those of the Public Switch Telephone Network.

There is therefore a need for an improvement in the interaction between the personal computers and the telephone system, even when a proprietary line interface is considered. This is the condition of allowing new possibilities and enhancements in the interaction between the personal computer and the telephone network, and particularly taking advantage of the audio capabilities of the recent computers.

SUMMARY OF THE INVENTION

The technical problem to be solved by the present invention is to increase the interaction between a personal computer and the telephone system, in particular when no modem equipment is available, in order to take advantage of the multimedia possibilities that are offered by the computer.

The technical problem is solved by the present invention which is defined in the independent claim 1. Basically, there is provided an apparatus or adapter for attaching a personal computer PC comprising an audio system to a telephone network. The apparatus comprises a first connector for the connection to the base of a telephone set of a telephone system, a second connector for the attachment of a handset. When the apparatus and the personal computer are powered-off, the connection between the first connector and the second connector is maintained so that the handset can be directly used in association with the base of the telephone set. During power-on, the voice signal that is generated by the microphone of the handset is diverted by means of switching means, as well as the analog signal that is being produced by the audio system of the PC, and then transmitted to the remote party via the base of the telephone network.

This useful, simple and low cost arrangement allows the personal computer to get rid of any line interface requirements and to be well adapted to any kind of telephone system, since it takes advantage of the line interface. This is particularly useful in the case of a PABX since it is possible to use the line interface of the base equipment which is often supplied by the manufacturer of the PABX system.

In a preferred embodiment of the invention, the audio system of the PC is fitted with a headset (50) via a second analog channel, thus providing the possibility to use the headset as a hand-free phone external kit. Since the headset and the headphone can still be operated at the same time, the invention provides with the possibility of simple but effective two-person conference call at the same desk.

The invention is particularly adapted for the use of specific software running in the PC for producing DTMF control codes and more particularly audio files. This permits to enhance the ergonomy and the control of the complex features and facilities which are offered by modern PABX systems, such as voice message recording for instance, and which are normally controlled by means of the simple keyboard of the telephone set. The invention even allows the possibility to use efficient Graphic User Interface for controlling the basic functions of the PABX telephone systems, and thus increase the interaction between the latter and the personal computer.

More particularly, the invention renders possible the use of auto-dialing and voice server functions.

DESCRIPTION OF THE PREFERRED EMBODIMENT OF THE INVENTION

Figure 1:
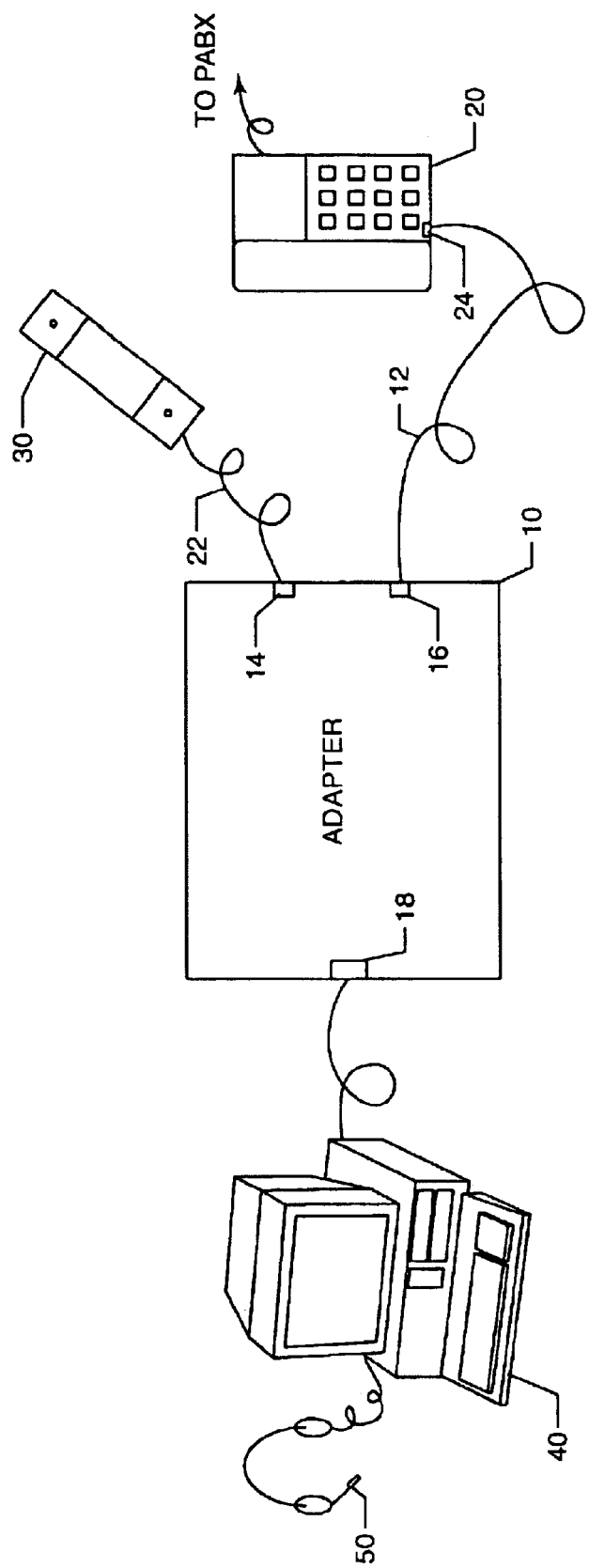
FIG. 1 illustrates the principle concept of the present invention in one embodiment which permits to substantially increase the interaction between a personal computer and a telephone system.

With respect to the FIG. 1 there is shown the basic principle of the apparatus or adapter according to an embodiment of the present invention. The invention permits an easy attachment to a PABX system because it takes advantage of the electrical characteristics of the actual existing telephone set which is designed and provided by the manufacturer of the PABX. Originally, the proprietary telephone set comprises a handset 30 having a 4 wire-cable 22 which is to be connected into a plug 24 of a base 20. Plug 24 may be for instance a RJ9 plug or any other plug which may be used for performing a four wire electrical connection in telephone systems.

In the arrangement of the present invention, the cable 22 of handset 30 is now connected to a corresponding plug 14 of an adapter 10 instead of being plugged in plug 24. An additional four-wire cable 12 is used for the connection of adapter 10 to base 20 via the existing RJ9 plug 24. Therefore, adapter 10 is connected to the existing proprietary telephone base 20 via cable 12 and plug 24, which plug was originally designed for the electrical connection of the handset 30 to the base.

On the other side, adapter 10 of the present invention is connected via a four wire cable 32 to the audio device of a personal computer, and more particularly to the audio PC card that is generally located into a computer. A classical headset comprising a headphone and a microphone is also connected to the audio system of the personal computer 40 via the traditional Mic_in and Line_out plugs.

Figure 2:
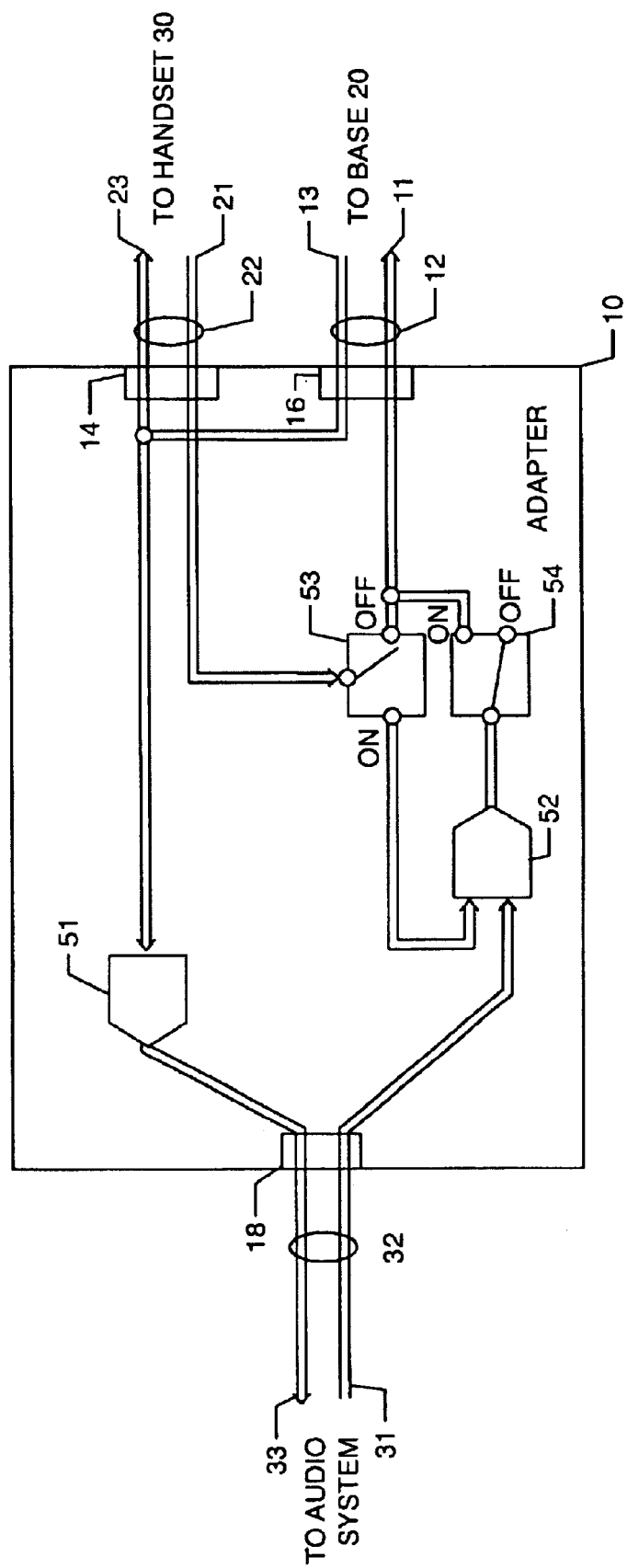
FIG. 2 illustrates the internal circuitry of the adapter 10 in accordance with an embodiment of the present invention.

With respect to FIG. 2 there is shown the detail of the internal structure of adapter 10. As mentioned above, handset 30 is connected to adapter 10 via plug 14 by means of a four-wire cable 22. The latter further comprises a first set of wires 21 which is dedicated to the connection of the microphone of handset 30, and a second set of wires 23 which is dedicated to the connection of the phone of handset 30.

Similarly, four-wire cable 12 connecting base 20 to adapter 10 comprises a first set of wires 11 for receiving the Xmit voice signal which is to be transported through the PABX system and a second set of wires 13 carrying the analog signal that is provided by the PABX telephone network. First set of wires 13 is connected to to the input of a driver 51 as well as to the second set of wires 23 connected to the phone of handset 30. Driver 51 is generally based on a differential amplification circuit being well known to the skilled man and which will not be elaborated on with further details.

Finally, four-wire cable 32 which allows the attachment of adapter 10 to the audio system of the personal computer which comprises a first set of two wires 31 carrying the signal generated from the audio system and a second set of two wires 33 for carrying the signal that is to be transmitted to the latter, thereby permitting a bi-directional analog communication channel with the latter. It should be noticed that this analog communication channel is separated than the analog Micro_in and Line_out channel that is used for the connection to the headset 50.

In one embodiment of the invention, the audio system of the personal computer may comprise a CODEC chip, such as the AC'97 SoundPort® Codec manufactured by Analog Devices, and the first set of wires 31 carries the output signal produced by the chip, while the second set of wires 33 carries the voice signal being introduced within the latter.

In addition to driver 51, adapter 10 comprises a mixing circuit 52, also based on a differential amplification structure, which has a first input being connected to first set of wires 31 of cable 32 and a second input which is connected to a first node (ON) of a switch 53. Switch 53 has a second node that is connected to first set of wires 21 of cable 22 being attached to handset 30 and further comprises a third node (OFF) that is connected to wires 11 of cable 12 carrying the signal to be transmitted to base 20. The output of mixing circuit 52 is connected to a first node of a switch 54, which has a second (ON) and a third node (OFF). The second node (ON) of switch 54 is connected to the third node (OFF) of switch 53. Switches 53 and 54 may be two-wires switches permitting the switching of the connection of a differential analog signals. They are controlled so as to achieve the electrical connection of the handset 30 to base 20 when the computer and the adapter are both powered-off. In that case, switch 53 causes the electrical connection of its second and third nodes as it illustrated in FIG. 2, while switch 54 performs the connection between its first and third node. Conversely, when both the adapter 10 and the personal computer 40 are powered on, the switches are controlled so as to achieve the electrical connection between their first and second node. More particularly, switch 53 causes the voice signal generated from the microphone of handset 30 to be introduced into the mixing circuit 52 and to be mixed with the voice signal generated by the audio system of computer 40 and carried on wires 31. Also, when the adapter 10 is powered on, switch 54 causes the voice signal generated at the output of mixing circuit 52 to be carried to the base 20 via first set of wires 11 of cable 12.

In a preferred embodiment of the invention, driver 51 and mixing circuit 52 are associated with a set of isolation capacitors in order to introduce an appropriate galvanic isolation which is necessary between the personal computer 40 and the telephone base 20. Indeed, in many PABX telephone systems it appears that the telephone sets are not isolated from the PABX. The use of high impedance differential amplifiers for embodying driver 51 and mixing circuit 52 permits to facilitate the galvanic isolation since low values of capacitors may be considered.

It should be also noticed that cable 32 is used for conveying an analog communication channel that is different from that which is traditionally employed for the headset 50. This is an important feature of the invention and results in a substantial advantage. Indeed, the connection of adapter 10 permits that the local voice signal that is generated by the microphone of headset 50 is entered into the DAC chip on the audio system of the PC for its transport towards wires 31, but without been feedback to the local headphone, thus preventing any Larsen type effect. Conversely, the remote voice which is received from the PABX telephone network is received on wires 33 of cable 32 and introduced into the audio system of the PC so that it can be routed to the headset 50. In no way, the remote analog signal is being mixed with the local voice signal generated by the microphone of the headset 50 (Mic_in input) and be transported back to the remote calling party. Therefore, with the arrangement of the present invention, the classical headset 50 may be simply used as a hand-free phone external kit without modification, nor Larsen effect. In a preferred embodiment of the invention, the second analog channel that is used for the connection between the personal computer 40 and adapter 10 is simply based on the audio connections that are generally used when the audio system is employed in association with a modem card. More particularly, the first set of wires 31 can be connected to receive the modem_out signal, and, conversely, second set of wires 32 receives the generally called a modem_in signal that the audio system receives from the modem. Obviously, in the arrangement of the present invention, no modem card is used since, as explained above, the personal computer is to be used in an environment based on a PABX system and a LAN network. Therefore, a very simple connection can be achieved and the modem-in and the modem-out signals existing in the audio systems can be used for the connection of the wires 31 and 33.

Since adapter 10 is connected to the personal computer 40 via a second, separate, analog channel that are different than that used by the headset 50, the local headset can be used as a hand-free phone external kit for telephone base 20, even if the line interface of the latter is proprietary. Additionally, because of the advantageous internal wiring of adapter 10, and the existence of mixing circuit 52, it appears that the original handset 30 still remains operational, what allows a private and effective two-persons conference call at a same desk.

Below are described some useful and very advantageous applications of the adapter 10 which are permitted by the adapter of the present invention. This demonstrates the substantial effect brought by the latter, and which permits, at a very low cost, a close interaction between the personal computer 40 and the PABX telephone system.

Voice Announcements:

Audio sources coming either from a (not shown) CDROM equipment or for WAV files stored into the memory may be easily played for producing a corresponding audio analog signal which can be transmitted to wires 31 and then to the PABX telephone network. Voice announcements are made very easy with the interface adapter of the present invention.

Voice Recording:

Conversely, the remote voice signal that is received from the PABX telephone network is transmitted via lead 33 to the audio system of the personal computer 40 for storage purpose. Additionally, the local voice analog signal can also be recorded. In a particular embodiment, the storing process can be associated with an automatic Dictaphone system that permits to produce a text of the conversation between a local user and a remote users occurring through the telephone network.

Automatic Dialing from Address Book:

The invention allows the use of the private telephone network to be enhanced. Indeed, once the user has seized the handset 30, adapter 10 permits the personal computer to run a specific software program that handles a collection of telephone numbers and produces the corresponding DTMF tones associated to a particularly telephone number.

PC Graphic User Interface for DTMF Vocal Server

In order to improve the ergonomy of the telephone PABX, the adapter 10 of the present invention permits the personal computer 40 to take control of the generation of the DTMF codes for enhancing the control of the sophisticated voices services provided by the PABX. Indeed, considering for instance the control of the voice message services provided by the PABX, it appears that the memorization and the execution of the different DTMF tones and codes to introduce into the telephone network, for instance a password, is not very convenient for the user. By means of the adapter 10, a personal computer can offer an graphical interface user for automatically producing the sequence of DTMF tones, by means of appropriate audio files, in order to take control of the voice message services functions provided by the PABX. This substantially increases the ergonomy of a complex existing PABX system.

What is claimed is:

1. Apparatus for the attachment of a personal computer having an audio system to a telephone network comprising:
   a first connector for attachment of the apparatus to the base of a telephone set designed to operate on said telephone network;
   a second connector for attachment of the apparatus to a handset of said telephone set;
   a switching arrangement operating during power-off of the apparatus for maintaining connection between said first connector and said second connector so that the handset can be directly used in association with said base, said switching arrangement being operable during power-on of said apparatus, for directing an audio signal generated by the audio system of said personal computer to-the base of said telephone set for transmission to said telephone network,
   whereby said personal computer can take advantage of the line interface characteristics of said base.

2. Apparatus according to claim 1 comprising a mixer for combining the voice signal generated by the microphone of the handset and an analog signal produced by the audio system for transmission to the telephone network via said base.

3. Apparatus as claimed in claim 1 arranged to direct an audio signal received from the base via said first connector to a third connector for processing via said audio system so that the audio system can be used as an hand-free phone external kit.

4. Apparatus according to claim 2 comprising:
   a first switching arrangement having a first, a second and a third node;
   a second switching arrangement having a first, a second and a third node;
   wherein:
      said first node of said first switching arrangement is connected to the microphone of said handset through said second connector;
      said second node of said first switching arrangement is connected to a first input of said mixing means; and
      said third node of said first switching arrangement is connected to said base for transmitting the analog signal to said telephone network;
      said first node of said second switching arrangement is connected to we output of said mixer; and
      said second node of said second switching arrangement is connected to said third node of said first switching arrangement,
      whereby said first and second switching arrangements have respectively in power-on condition their first and second node being connected so that the output of said mixer can be transmitted through said first connector and base to the PABX telephone network.

5. Apparatus according to claim 4 comprising a set of capacitors for introducing a galvanic isolation between said telephone network and said personal computer.

6. Apparatus according to claim 5 that is connectable to the Modem_In/Modem_Out connector of the PC audio system.

7. Personal computer comprising an apparatus as claimed in claimed 1, and further comprising:
   a dialing book data base;
   a graphical user interface;
   a DTMF tone control signals generator which is associated with the dialing book data base and the graphical user interface in order to provide enhanced auto-dialing facilities; and
   a generator for producing audio signals to be transmitted to said telephone network through said apparatus.

* * * * *

UNITED STATES PATENT AND TRADEMARK OFFICE
CERTIFICATE OF CORRECTION

| | |
|---|---|
| PATENT NO. | : 6,757,379 B1 |
| DATED | : June 29, 2004 |
| INVENTOR(S) | : Malysa Lane |

It is certified that error appears in the above-identified patent and that said Letters Patent is hereby corrected as shown below:

Column 6,
Line 39, change from "to we" to -- to an --.

Signed and Sealed this

Twenty-first Day of June, 2005

JON W. DUDAS
*Director of the United States Patent and Trademark Office*